(12) United States Patent
Kim

(10) Patent No.: US 7,372,605 B2
(45) Date of Patent: May 13, 2008

(54) POLYGON MIRROR APPARATUS

(75) Inventor: Hyun-surk Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 156 days.

(21) Appl. No.: 11/108,120

(22) Filed: Apr. 18, 2005

(65) Prior Publication Data
US 2005/0231054 A1 Oct. 20, 2005

(30) Foreign Application Priority Data
Apr. 19, 2004 (KR) .................. 10-2004-0026654

(51) Int. Cl.
G02B 28/06 (2006.01)
(52) U.S. Cl. ..................... 359/216; 359/200
(58) Field of Classification Search ............ None
See application file for complete search history.

(56) References Cited

U.S. PATENT DOCUMENTS

| 2002/0130948 A1 | 9/2002 | Itami et al. |
| 2005/0225820 A1* | 10/2005 | Kim et al. ............ 359/216 |

FOREIGN PATENT DOCUMENTS

| CN | 1315773 A | 10/2001 |
| JP | 62-34120 | 2/1987 |
| JP | 5-346552 | 12/1993 |
| JP | 9-297276 | 11/1997 |
| JP | 11-258537 | 9/1999 |
| JP | 2001-83450 | 3/2001 |
| JP | 2002-365580 | 12/2002 |
| KR | 97-50179 | 8/1997 |

OTHER PUBLICATIONS

Office Action dated Sep. 29, 2005 of Korean Patent Application No. 10-2004-0026654 and English translation.
The First Office Action issued in the corresponding Chinese Patent Application No. 200510065931.0 (6 pages) (4 pages of English language translation).

* cited by examiner

*Primary Examiner*—James Phan
(74) *Attorney, Agent, or Firm*—Staas & Halsey LLP

(57) ABSTRACT

A polygon mirror apparatus preventing a polygon mirror from separating from a rotor, having a rotor housing integrally formed with a polygon mirror is provided. The polygon mirror apparatus includes a base, a bearing coupled with the base, and a rotating shaft installed at the bearing to be rotatable. A polygon mirror is coupled with the rotating shaft to deflect and scan incident light. A driving source rotates a polygon mirror using electromagnetic power. A stator is positioned at the bearing, and a rotor installed around the stator so as to be rotatable, and is partially inserted into the polygon mirror by insert molding.

20 Claims, 5 Drawing Sheets

POLYGON MIRROR APPARATUS

CROSS-REFERENCE TO RELATED APPLICATIONS

This application claims the benefit from Korean Patent Application No. 10-2004-26654, filed on Apr. 19, 2004, in the Korean Intellectual Property Office, the disclosure of which is hereby incorporated by reference.

BACKGROUND OF THE INVENTION

1. Field of the Invention

The present invention relates to a polygon mirror apparatus with a polygon mirror made using a plastic material, and more particularly, to a polygon mirror apparatus in which a rotor frame and a polygon mirror are formed integrally.

2. Description of the Related Art

Generally, a polygon mirror apparatus is used in a laser scanning unit (LSU) for devices such as a laser printer, a digital copy machine, a barcode reader, and a facsimile machine. The polygon mirror apparatus scans a beam emitted from a light source of the LSU, in a main scan direction, using a rotating polygon mirror.

With the development of technology, print speed of devices using an LSU has increased. Accordingly, the polygon mirror apparatus is required to rotate a polygon mirror at a high speed, and to operate for a long period. In addition, the polygon mirror is required to have a reflectance greater than 85% so as to increase efficiency of a scanning beam. To meet these requirements, conventional polygon mirror apparatus use a polygon mirror manufactured by microprocessing of aluminum that has with a degree of purity of at least 99%.

Referring to FIG. 1, a conventional polygon mirror apparatus includes a base 11, a bearing 13 fixed at the base 11, and a rotating shaft 15 installed at the bearing 13 so as to be rotatable. A rotor frame 17 is coupled with the rotating shaft 15. The apparatus also includes a driving source 20, and a polygon mirror 30 installed at the rotor frame 17.

The driving source 20 is installed at an outer circumference of the bearing 13 and at the rotating shaft 15 so as to rotate the rotating shaft 15 using electromagnetic power. The driving source 20 includes a stator core 21, a rotor housing 23, and a magnet 25. The stator core 21 is fixed at the outer circumference of the bearing 13 and includes a wound coil 22. The rotor housing 23 is coupled with the rotor frame 17 and surrounds the stator core 22.

The polygon mirror 30 is rotated by the driving source 20, thereby deflecting and scanning a beam incident into a reflecting mirror 31 provided on a sidewall of the polygon mirror 30. The polygon mirror 30 is coupled to an outer circumference of the rotor frame 17 and is fixed thereto with a fixing member 35. The polygon mirror 30 is manufactured using an aluminum material with a high degree of purity. The polygon mirror includes reflecting mirrors formed through micromachining of metals.

Since the polygon mirror 30 in the conventional polygon mirror apparatus is manufactured using expensive aluminum material, the manufacturing cost is high. Moreover, since complicated micromachining of metals is used to form the polygon mirror 30, the productivity is low. In addition, a separate rotor frame is used, the polygon mirror is fixed to the rotor frame with a separate fixing member. Thus, the assembly processes are complicated and the number of parts increases.

SUMMARY OF THE INVENTION

The present invention provides a polygon mirror apparatus with an improved coupling structure of a polygon mirror that is formed using an improved material so as to allow a rotor housing and the polygon mirror to be integrally formed.

According to an aspect of the present invention, a polygon mirror apparatus includes a base, a bearing coupled with the base, and a rotating shaft positioned at the bearing so as to be rotatable. A polygon mirror is coupled with the rotating shaft to deflect and scan incident light. A driving source rotates the polygon mirror using electromagnetic power. A stator is positioned at the bearing and a rotor is positioned around the stator to be rotatable. Part of the rotor is embedded within the polygon mirror, and inserted into the polygon mirror by insert molding.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
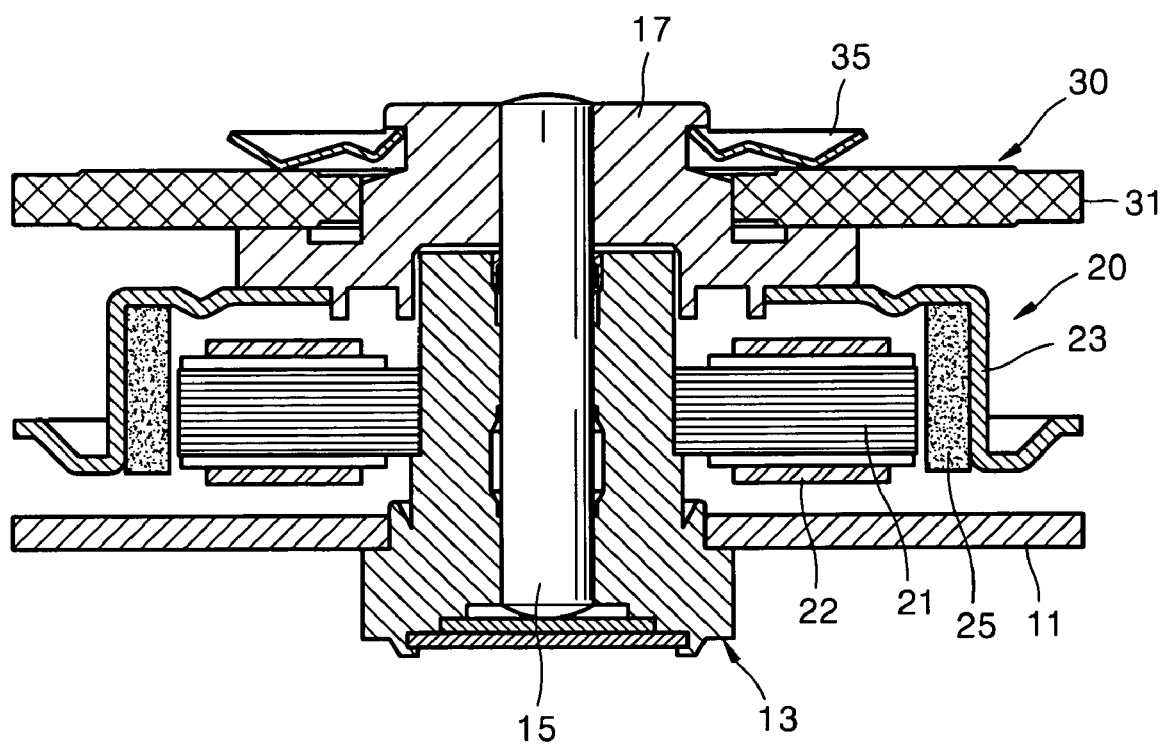
FIG. 1 is a schematic sectional view of a conventional polygon mirror apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2A:
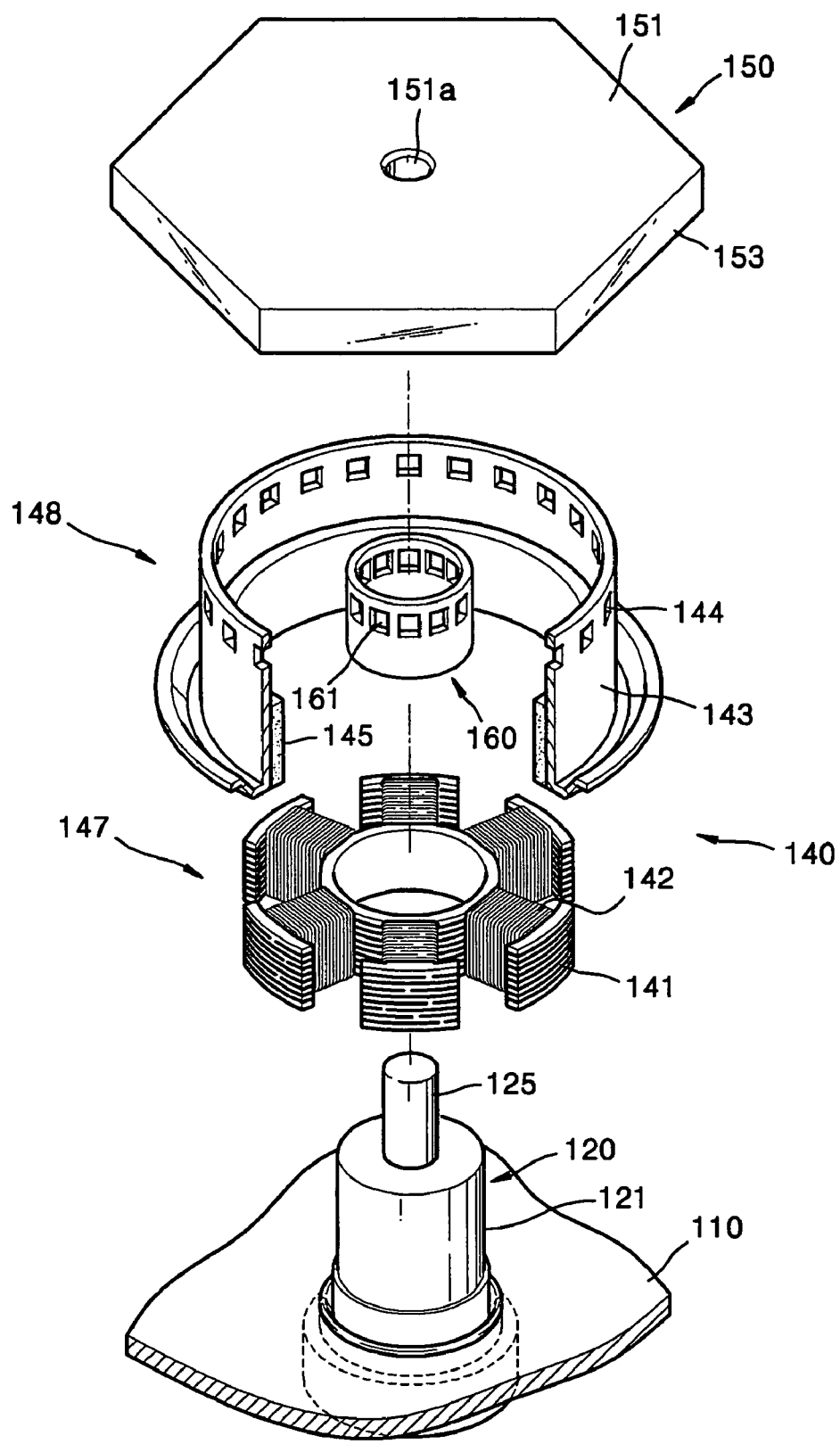
FIG. 2A is an exploded, partially cut-away perspective view of a polygon mirror apparatus according to a first embodiment of the present invention.
Figure 2B:
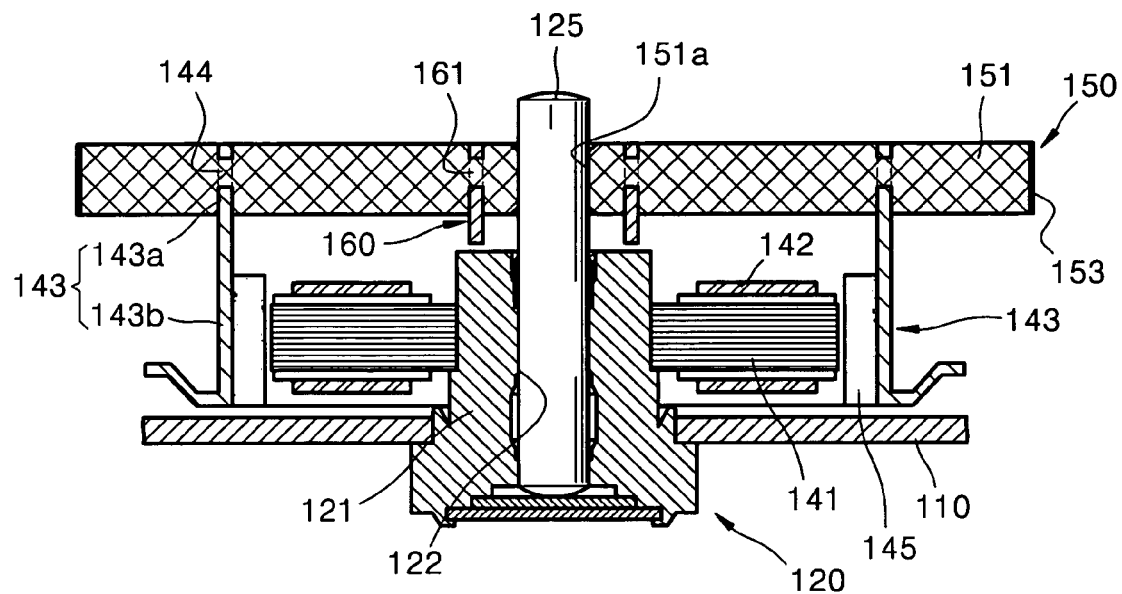
FIG. 2B is a sectional view of the polygon mirror apparatus according to the first embodiment of the present invention.

Referring to FIGS. 2A and 2B, a polygon mirror apparatus according to a first embodiment of the present invention includes a base 110, a bearing 120 positioned on the base 110, and a rotating shaft 125 installed at the bearing 120 to be rotatable. A driving source 140 rotates the rotating shaft 125. A polygon mirror 150 is molded so as to be directly coupled with the driving source 140.

The bearing 120 includes a bearing housing 121 and a first opening 122 formed in the bearing housing 121. The bearing 120 supports the rotating shaft 125 inserted into the first opening 122 so as to be rotatable by hydrodynamic pressure or aerodynamic pressure.

The driving source 140 is installed at the bearing housing 121 and the rotating shaft 125 and rotates the rotating shaft 125 through electromagnetic power. The driving source 140 includes a stator, fixed at the bearing 120, and a rotor. The stator 147 includes a stator core 141 fixed around an outer circumference of the bearing housing 121 and a coil 142 wound around the stator core 141. The rotor 148 includes a rotor housing 143 and a magnet 145.

The rotor housing 143 is coupled with the polygon mirror 150 through insert molding so as to encircle the stator core 141. The rotor housing 143 includes an insert portion 143a embedded within the polygon mirror 150 and a housing portion 143b encircling the stator 147.

The magnet 145 is installed on an inside surface of the rotor housing 143, and more specifically, on an inside surface of the housing portion 143b so as to face the stator core 141.

The insert portion 143a extends from the housing portion 143b, and includes at least one via-hole 144. Accordingly, when the polygon mirror 150 is molded to the rotor housing 143, part of the polygon mirror 150 is within the first via-hole 144. Accordingly, the polygon mirror 150 is not easily separable from the rotor housing 143, even when the polygon mirror 150 rotates at a high speed.

The polygon mirror 150 is rotated around the rotating shaft 125 by the driving source 140, thereby deflecting and scanning a beam incident into a reflector 153 provided on a sidewall of the polygon mirror 150. An example polygon mirror 150 is made mainly using a plastic material and is molded so as to be coupled with the rotor housing 143, for example, through insert molding. Accordingly, the polygon mirror 150 is fixed to the rotor housing 143 without requiring a separate fixing member as required by the conventional apparatus (see fixing member 35 illustrated in FIG. 1).

The polygon mirror 150 includes a polygon mirror body 151 with a second opening 151a. A sidewall of the polygon mirror body 151 is coated with a photocurable resin, and a reflector 153 is formed on the photocurable resin.

The second opening 151a has a diameter corresponding to a diameter of the rotating shaft 125. The rotating shaft 125 and the second opening 151a are coupled using, for example, push-fit installation so that the polygon mirror body 151 is fixed to the rotating shaft 125. According to an embodiment of the present invention, the polygon mirror 150 is integrally formed using insert molding so as to be aligned with the rotating shaft 125.

Deformation can occur during molding of the plastic polygon mirror body. The photocurable resin planarizes the polygon mirror body 151. Since the photocurable resin planarizes the sidewall of the polygon mirror 150, deformities in the reflector 153 caused by process errors occurring during insert molding are minimized. The reflector 153 is formed by coating the photocurable resin with a metal, such as aluminum (Al) or silver (Ag), having a high reflectance.

According to a second embodiment of the present invention, a ceramic layer, instead of the photocurable resin, is formed on the polygon mirror 150, and the reflector 153 is formed on the ceramic layer. The ceramic layer enhances the strength of the sidewall of the polygon mirror body 151. As a result, since the strength of the polygon mirror 150 is enhanced, the polygon mirror 150 better withstands a tensile load generated by a turning effect even when the polygon mirror 150 rotates at a high speed (for example, above approximately 10,000 rpm).

Figure 5:
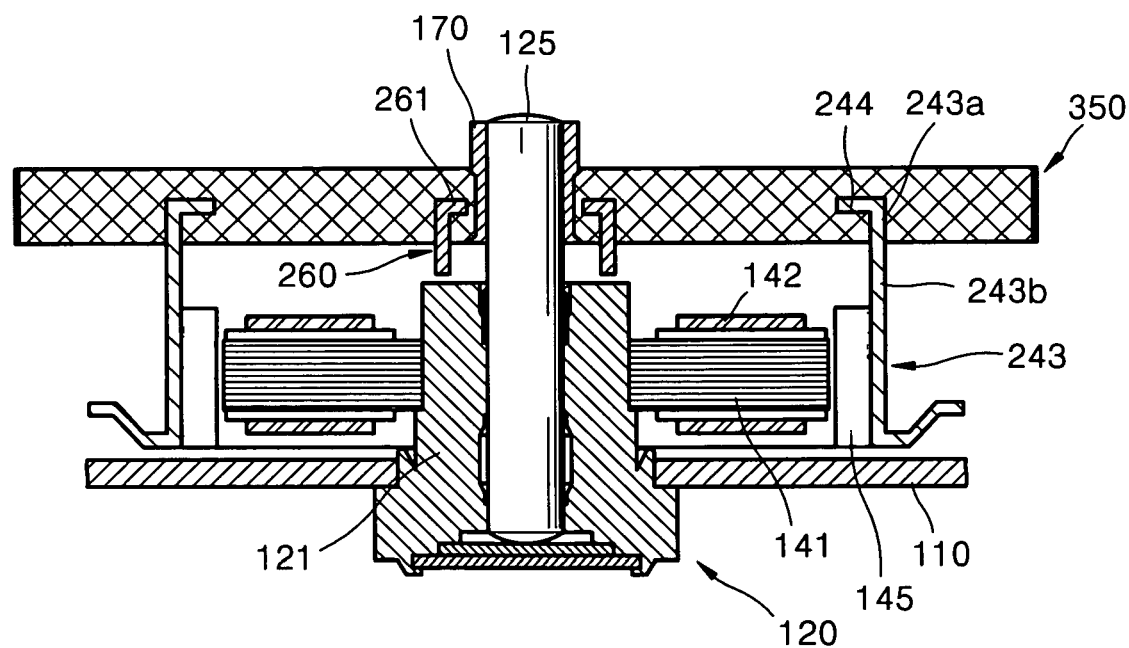
FIG. 5 is a sectional view of a polygon mirror apparatus according to a fourth embodiment of the present invention.
Figure 6:
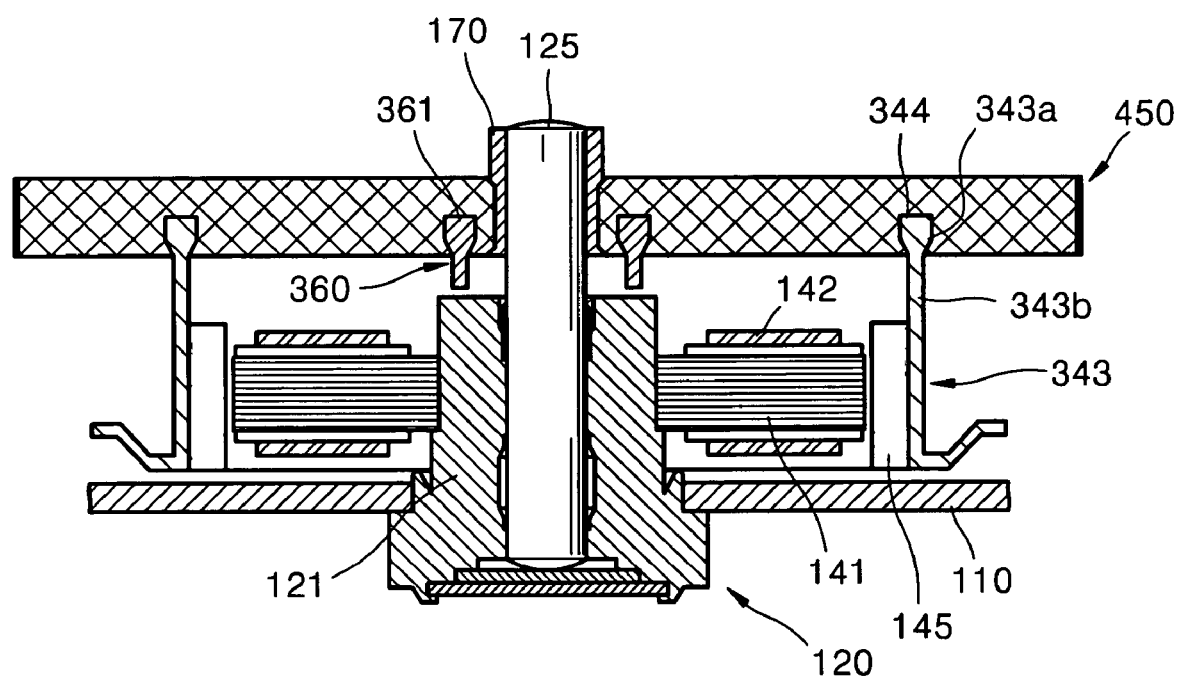
FIG. 6 is a sectional view of a polygon mirror apparatus according to a fifth embodiment of the present invention.

The polygon mirror apparatus further includes an oil splash-prevention cap 160 preventing oil from splashing outside the bearing 120. Part of the oil splash-prevention cap 160 is within the polygon mirror 150, through insert molding, and another part of the oil splashdown cap partially surrounds a part of the rotating shaft 125 that is exposed outside the bearing 120. The part of the oil splash-prevention cap 160 that is within the polygon mirror 150 includes at least one second via-hole 161. Accordingly, when the polygon mirror 150 is molded, part of a plastic material of the polygon mirror 150 is within the second via-hole 161. Thus, the oil splash-prevention cap 160 is not easily separated from the polygon mirror 150 even when the polygon mirror 150 rotates at high speed. An oil splash-prevention cap is not restricted to this first described embodiment and may have other structures such as illustrated in FIGS. 5 and 6, for example.

A conventional rotor frame can be removed and replaced with a rotor housing 143 according to an embodiment of the present invention. The rotor housing is coupled with the polygon mirror 150, made of a plastic material, by forming the polygon mirror 150 using insert molding The present invention provides a polygon mirror apparatus having performance that is equal to, or greater than, that of a conventional polygon mirror apparatus and having a simplified structure. Accordingly, according to the present invention, a number of assembly processes and manufacturing costs are reduced.

In second through fifth embodiments of the present invention described below, the structure and disposition of a base, a bearing, a rotating shaft, and a driving source are substantially the same as those of the base 110, the bearing 120, the rotating shaft 125, and the driving source 140 included in the polygon mirror apparatus illustrated in FIGS. 2A and 2B, according to the first embodiment of the present invention. Accordingly, a detailed description thereof will be omitted.

Figure 3:
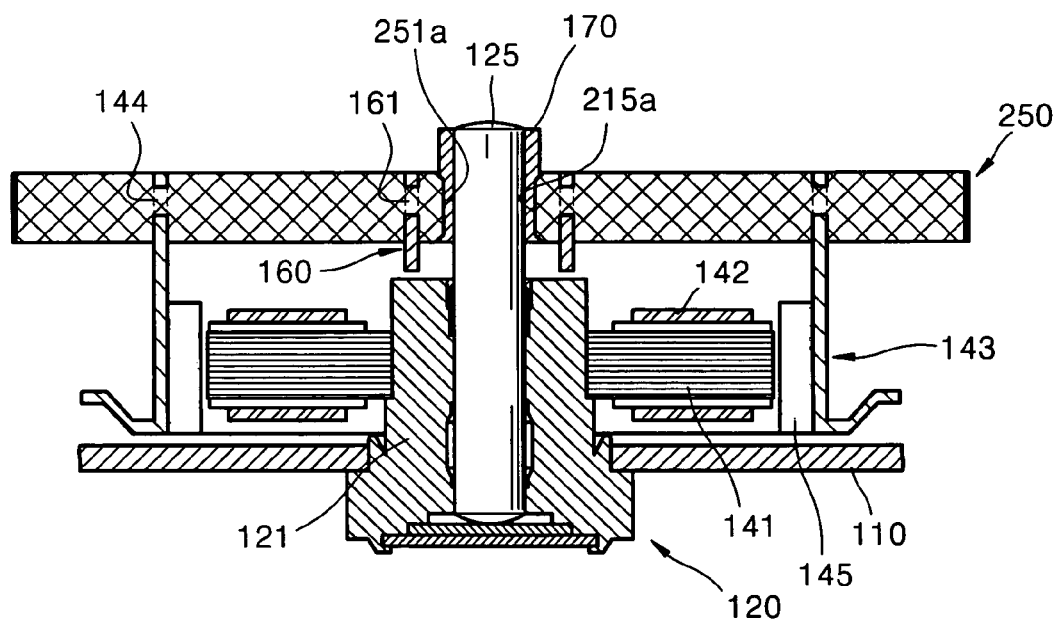
FIG. 3 is a sectional view of a polygon mirror apparatus according to a second embodiment of the present invention.

Referring to FIG. 3, a polygon mirror apparatus, according to the second embodiment of the present invention, includes a coupling structure between a polygon mirror 250 and the rotating shaft 125.

The polygon mirror 250 includes an opening 251 having a diameter greater than that of the rotating shaft 125. In addition, a shaft housing 170 is interposed between the opening 251a and the rotating shaft 125. The shaft housing 170 is a metal material, and is inserted into the polygon mirror 250 when the polygon mirror 250 is formed using insert molding. The shaft housing 170 has a ring shape and, for example, is push fitted onto the rotating shaft 125, thereby fixing the polygon mirror 250 to the rotating shaft 125. The shaft housing 170 provided between the polygon mirror 250 and the rotating shaft 125 helps to prevent the polygon mirror 250 from separating from the rotating shaft 125 and cracking during high-speed rotation.

Figure 4:
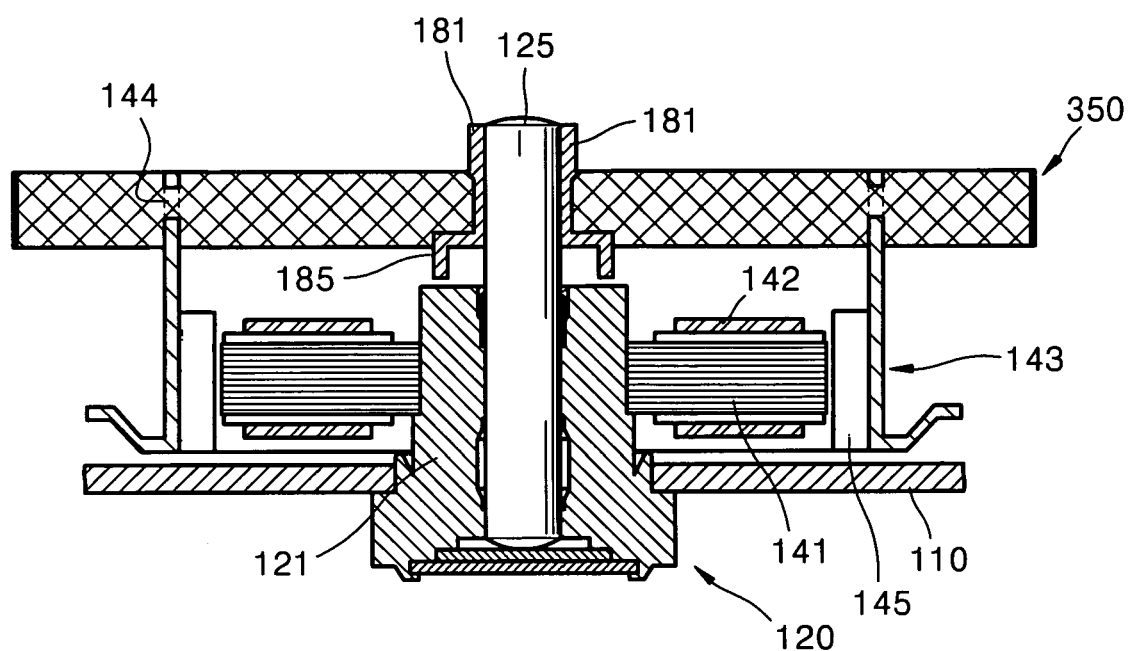
FIG. 4 is a sectional view of the polygon mirror apparatus according to a third embodiment of the present invention.

Referring to FIG. 4, a polygon mirror apparatus according to the third embodiment of the present invention includes a shaft housing 181 and an oil splash-prevention cap 185 that are integrally formed As illustrated in FIG. 4, when the shaft housing 181 and the oil splash-prevention cap 185 are formed integrally, a polygon mirror 350 formed by insert-molding is prevented from being separated from the oil splash-prevention cap 185 during high-speed rotation, without the need of forming a second via-hole (via hole 161 illustrated in FIG. 3). In addition, the number of assembly processes is reduced.

Referring to FIG. 5; a polygon mirror apparatus according to the fourth embodiment of the present invention is substantially the same as that according to the first through third embodiments of the present invention, with the exception of a structure of a rotator housing 243.

The rotor housing 243 includes an insert portion 243a that is within the polygon mirror 350 and a housing portion 243b encircling the stator. The insert portion 243a extends from the housing portion 243b and includes an angled portion 244 at the end of the insert portion end. Accordingly, when the polygon mirror 350 is molded with respect to the rotor housing 243, part of a plastic material of the polygon mirror 350 is present around the angled portion 244. Thus, the polygon mirror 350 is not easily separable from the rotor housing 243 even during a high-speed rotation.

In addition, the polygon mirror apparatus according to the fourth embodiment may further include an oil splash-prevention cap 260. The oil splash-prevention cap 260 has an end portion 261 that is angled and positioned within the polygon mirror 350. Thus, the polygon mirror 350 is not easily separated from the oil splash-prevention cap 260. The oil splash-prevention cap 260 is not restricted to the described fourth embodiment and may have other structures as illustrated in FIGS. 2A through 4 and FIG. 6, for example.

Moreover, the polygon mirror apparatus according to the fourth embodiment may further include the shaft housing 170 interposed between the polygon mirror 350 and the rotating shaft 125. The shaft housing 170 has been described above, and thus a detailed description thereof will be omitted.

Referring to FIG. 6, a polygon mirror apparatus according to the fifth embodiment of the present invention is substantially the same as that according to the first through third embodiments of the present invention, with the exception of a structure of a rotator housing 343.

The rotor housing 343 includes an insert portion 343a inserted into a polygon mirror 450, and a housing portion 343b encircling the stator. The insert portion 343a extends from the housing portion 343b, and includes a head 344 that is relatively thicker at an end portion than other portions of the insert portion 343a. Accordingly, when the polygon mirror 450 is molded with respect to the rotor housing 343, part of a plastic material of the polygon mirror 450 is present around the head 344 so that the polygon mirror 450 is not easily separated from the rotor housing 343 even during high-speed rotation. In addition, according to an embodiment of the present invention, the insert portion may be both angled at an end and relatively thicker.

In addition, the polygon mirror apparatus according to the fifth embodiment may further include an oil splash-prevention cap 360. The oil splash-prevention cap 360 has an end portion 361, relatively thicker than other portions of the oil splash-prevention cap 360, and is positioned within the polygon mirror 450. Thus, the polygon mirror 450 is not easily separated from the oil splash-prevention cap 360. The oil splash-prevention cap 360 is not restricted to the fifth embodiment and may have other structures as illustrated in FIGS. 2A through 5, for example.

Moreover, the polygon mirror apparatus according to the fifth embodiment may further include the shaft housing 170 interposed between the polygon mirror 450 and the rotating shaft 125. The shaft housing 170 has been described above, and thus a detailed description thereof will be omitted.

As described above, in a polygon mirror apparatus according an embodiment of the present invention, a polygon mirror is made using plastic material and insert molding, thereby facilitating mass production at a lower cost than manufacture of a conventional polygon mirror using a metal material. In addition, since a rotor housing is directly coupled with a polygon mirror, without a rotor frame, the number of assembly processes and the number of parts are reduced. Also, an oil splash-prevention cap is used, thereby efficiently preventing a reflecting surface of the polygon mirror from being contaminated during rotation. Moreover, since a shaft housing is used when the polygon mirror is installed at a rotating shaft, the polygon mirror reliably operates even during high-speed rotation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A polygon mirror apparatus comprising:
a base;
a bearing coupled with the base;
a rotating shaft installed at the bearing to be rotatable;
a polygon mirror coupled with the rotating shaft to deflect and scan incident light; and
a driving source rotating the polygon mirror using electromagnetic power, the driving source comprising a stator positioned at the bearing, and a rotor installed around the stator so as to be rotatable,
wherein part of the rotor is embedded in the polygon mirror,
the rotor comprises a rotor housing comprising an insert portion in the polygon mirror, and a housing portion encircling the stator, and a magnet installed on an interior wall of the housing portion so as to face the stator, and
the insert portion extends from the housing portion and comprises a plurality of via-holes.

2. The polygon mirror apparatus of claim 1, wherein of the polygon mirror is in the plurality of via-holes preventing the polygon mirror from separating from the rotor.

3. The polygon mirror apparatus of claim 1, wherein the insert portion extends from the housing portion and comprises an angled portion at its end portion, and part of the polygon mirror is around the angled portion preventing the polygon mirror from separating from the rotor.

4. The polygon mirror apparatus of claim 1, wherein the insert portion extends from the housing portion and comprises a head relatively thicker than other portions of the insert portion, and part of the polygon mirror is around the head, preventing the polygon mirror from separating from the rotor.

5. The polygon mirror apparatus of claim 1, wherein the polygon mirror comprises:
a polygon mirror body made using a plastic material;
a photocurable resin coating a sidewall of the polygon mirror body to planarize the sidewall; and
a reflector formed on the photocurable resin.

6. The polygon mirror apparatus of claim 5, wherein the reflector is formed by coating the photocurable resin with aluminum or silver.

7. The polygon mirror apparatus of claim 1, wherein the polygon mirror comprises:
a polygon mirror body made using a plastic material;
a ceramic layer formed on a sidewall of the polygon mirror body to enhance a strength of the sidewall; and
a reflector formed on the ceramic layer.

8. The polygon mirror apparatus of claim 7, wherein the reflector is formed by coating the ceramic layer with aluminum or silver.

9. The polygon mirror apparatus of claim 1, further comprising an oil splash-prevention cap, part of which is within the polygon mirror and the rest of which encircles a part of the rotating shaft that is exposed outside the bearing so as to prevent oil from being splashed from the bearing.

10. The polygon mirror apparatus of claim 9, wherein part of the oil splash-prevention cap is within the polygon mirror and comprises a via-hole, preventing the polygon mirror from separating from the oil splash prevention cap.

11. The polygon mirror apparatus of claim 9, wherein the part of the oil splash-prevention cap inserted into the polygon mirror comprises an end portion fangled, thicker than other portions of the part, or angled and thicker than other portions so that the polygon mirror is not separated from the oil splash-prevention cap after the polygon mirror is molded.

12. The polygon mirror apparatus of claim 9, wherein the oil splash-prevention cap, is inserted into the polygon mirror by insert molding.

13. The polygon mirror apparatus of claim 1, wherein the polygon mirror comprises an opening with a diameter substantially corresponding to a diameter of the rotating shaft at a center, and the rotating shaft is insertable into the opening.

14. The polygon mirror apparatus of claim 1, wherein the polygon mirror comprises an opening with a diameter greater than a diameter of the rotating shaft at a center, and the polygon mirror apparatus further comprises a shaft housing interposed between the opening and the rotating shaft.

15. The polygon mirror apparatus of claim 14, further comprising an oil splash-prevention cap, part of which is within the polygon mirror and the rest of which encircles a part of the rotating shaft that is exposed outside the bearing so as to prevent oil from being splashed from the bearing.

16. The polygon mirror apparatus of claim 15, wherein part of the oil splash-prevention cap is positioned within the polygon mirror and comprises a via-hole preventing separation of the polygon mirror from the oil splash-prevention cap after the polygon mirror is molded.

17. The polygon mirror apparatus of claim 15, wherein the part of the oil splash-prevention cap within the polygon mirror comprises an end portion that is angled, thicker than other portions of the part, or angled and thicker than other portions of the part so that the polygon mirror is not separated from the oil splash-prevention cap after the polygon mirror is molded.

18. The polygon mirror apparatus of claim 15, wherein the shaft housing is integrally formed with the oil splash-prevention cap.

19. The polygon mirror apparatus according to claim 1, wherein the part of the rotor in the polygon mirror is embedded by insert molding.

20. The polygon mirror apparatus according to claim 1, wherein the polygon mirror is substantially made of plastic material.

* * * * *

UNITED STATES PATENT AND TRADEMARK OFFICE
CERTIFICATE OF CORRECTION

PATENT NO. : 7,372,605 B2  Page 1 of 1
APPLICATION NO. : 11/108120
DATED : May 13, 2008
INVENTOR(S) : Hyun-surk Kim It is certified that error appears in the above-identified patent and that said Letters Patent is hereby corrected as shown below:

Column 6, Line 32, after "wherein" insert --part--.

Column 7, Line 9, change "fangled," to --angled,--.

Signed and Sealed this

Seventh Day of October, 2008

JON W. DUDAS
*Director of the United States Patent and Trademark Office*